United States Patent [19]

Heaton et al.

[11] Patent Number: 5,538,530
[45] Date of Patent: Jul. 23, 1996

[54] METHOD FOR SAFELY DISPOSING OF PROPELLANT AND EXPLOSIVE MATERIALS AND FOR PREPARING FERTILIZER COMPOSITIONS

[75] Inventors: Harley L. Heaton, Manassas; Daman S. Walia, Woodbridge; Joseph J. Stashick, Leesburgh, all of Va.

[73] Assignee: Arctech Inc., Chantilly, Va.

[21] Appl. No.: 451,542

[22] Filed: May 26, 1995

[51] Int. Cl.$^6$ .................................................. C05F 11/02
[52] U.S. Cl. ........................ 71/24; 71/58; 71/63; 71/903; 149/124
[58] Field of Search ........................... 71/1, 58, 59, 63, 71/24, 903; 149/124

[56] References Cited

U.S. PATENT DOCUMENTS 3,897,237   7/1975   Musselman et al. .................. 71/1

FOREIGN PATENT DOCUMENTS 91023   1/1923   United Kingdom.

OTHER PUBLICATIONS

James E. Alleman, Nitocellulose Fines Seperation and Treatment, Workshop Proceedings, School of Civil Engineering, pp. 50–64, Nov. 4–5 1993.

*Primary Examiner*—Ferris Lander
*Attorney, Agent, or Firm*—Browdy and Neimark

[57] ABSTRACT

A one step process is provided which denitrifies explosives and propellants and reclaims the evolved nitrogen therefrom while concurrently modifying the remaining carbonaceous materials into humic acid suitable for plant fertilizer applications. Explosives and propellants are hydrolyzed with a solution of ACTOSOL® humic acid extract. The humic acid extract fixes the free nitrogen evolved, preventing its loss as ammonia or $NO_x$ gases. The ACTOSOL® fixed nitrogen is then available directly to plants as slow-release nitrogen, and can directly replace nitrogen derived from urea or other sources in plant fertilizers., The carbonaceous material remaining from the denitrification process is non-explosive and is taken up in the humic acid matrix. This material is immediately available to plants as a carbon source. The humic acid matrix chelates any metal ions released from the explosive or propellant as a consequence of the denitrification process, and makes these metal ions available to plants as micronutrients.

16 Claims, No Drawings

METHOD FOR SAFELY DISPOSING OF PROPELLANT AND EXPLOSIVE MATERIALS AND FOR PREPARING FERTILIZER COMPOSITIONS

FIELD OF THE INVENTION

The present invention provides a method for safely disposing of explosive and propellant materials. The present invention also provides a method for converting explosive and propellant materials to fertilizer for plants.

BACKGROUND OF THE INVENTION

International agreements require reduction in the stockpiles of conventional and nuclear munitions. There is therefore a great incentive to destroy and/or reclaim explosives, propellants, and pyrotechnic material efficiently and without significant environmental impact.

Procedures conventionally used to demilitarize conventional munitions include incineration of reclaimed explosives and open burning or detonation. However, many areas of the United States no longer permit open burning and detonation of large quantities of high-energy compositions; increasingly, constraints are placed even on the uncontrolled destruction of small quantities of these substances.

Federal and state environmental legislation to limit, control and remove pollutants entering the environment have resulted in a great many programs dealing with disposal of propellants and explosives. Pollutants resulting from disposal and clean-up of explosives and propellants must be reduced as much as possible. Moreover, explosives and propellants cannot be landfilled because of their energetic nature. Radioactive materials, many of which may be compounded with explosives or propellants, cannot be disposed of by open burning or detonation.

Although propellants and explosives can contain a great variety of different materials, there are some classes of materials that are conventionally used and must be disposed of in an environmentally safe way. For example, the propellant and explosive compounds themselves, such as nitrate esters, are generally dangerous, may be toxic, and cannot be landfilled or subjected to open burning. Oxides of nitrogen resulting from burning these compounds are regulated air pollutants which are toxic and irritating; these nitrogen oxides corrosively react with ozone photochemically to produce smog. Water-soluble nitrates in the propellants and explosives are toxic compounds which contribute to eutrophication of water systems.

Historically, many of these components of explosives and propellants have been removed from the environment using special-purpose incinerators which include gas scrubbers and solid particle collectors. These include flashing furnaces that remove all traces of explosive from metal parts to assure safety in handling; fluidized-bed incinerators that burn slurries of ground up propellants or explosives in oil; and rotary kilns to destroy explosive and contaminated waste and bulk explosives.

Procedures that have been suggested for decomposing explosives and propellants include fluidized-bed incineration, composting, and biodenitrification. Soluble components have been extracted with organic solvents. However, using organic solvents presents problems in disposing of the solvents used.

Chemical Abstracts No. 98:203821, discloses the results of an assessment of dry humus sediments contaminated with TNT. However, this is merely an assessment of the contents of the mixture, rather than an attempt to treat the TNT.

Chemical Abstracts No. 103:1222284, discloses the results of an investigation as to whether humus from a clear-cut coniferous forest could support nitrate reduction. This study found that ammonium was immobilized but not nitrified. No nitrate was assimilated or reduced to ammonium.

British patent specification 191,741 discloses a method for recovering ammonia from ammonia-containing gases by bringing the gas into contact with crude carbonaceous bodies such as soft lignite or peat. The carbonaceous material absorbs ammonia, which can then be used as a fertilizer. This method is limited to treating ammoniacal gases.

Musselman, U.S. Pat. No. 3,987,237, discloses a process for disposing of pyrotechnic flares comprised of magnesium sodium nitrate and a binder. The flare is crushed and soaked in a solvent to dissolve the binder material, and the dissolved binder is decanted. The remaining magnesium and sodium nitrate are washed in water to dissolve the sodium nitrate, which is recovered for use as a fertilizer. The remaining magnesium is dried for reuse as an ingredient in a pyrotechnic device. There is no indication that the nitrogen values can be recovered from the sodium nitrate.

Production of munitions-grade nitrocellulose causes a significant problem with respect to disposing of the waste "fines" inevitably discharged from the manufacturing operations. These waste solids are remarkably stable, and to date have been treated by alkaline hydrolysis. After alkaline hydrolysis, a nitrogen mass balance could not be achieved, and a substantial fraction of the nitrate-nitrogen remains bound after digestion to an unknown organic compound(s), as noted in *Nitrocellulose Fines Separation and Treatment, Workshop Proceedings*, School of Civil Engineering, Purdue University, West Lafayette, Ind., 4–5 Nov., 1993.

SUMMARY OF THE INVENTION

It is an object of the present invention to overcome the aforesaid deficiencies in the prior art.

It is another object of the present invention to provide a safe, effective method for denitrifying explosives and propellants.

It is a further object of the present invention to provide a method for reclaiming evolved nitrogen from propellants and explosives.

It is another object of the present invention to modify carbonaceous materials in propellants and explosives for incorporation into plant fertilizers.

It is yet another object of the present invention to destroy radioactive propellants and recover the radioactive component for disposal.

It is still another object of the present invention to provide fertilizer compositions comprising micronutrients.

According to the present invention, a one step process is provided which denitrifies explosives and propellants and reclaims the evolved nitrogen while concurrently modifying the remaining carbonaceous materials into humic acids suitable for plant fertilizer applications.

The carbonaceous materials are further broken down by hydrolysis. The precise chemical composition of these hydrolized materials is unknown, and, of course, depends upon what explosives or propellants are being denitrified.

Explosives and propellants are hydrolyzed with a basic solution of ACTOSOL® humic acid. The humic acid serves to fix or chelate the free nitrogen evolved, preventing its loss as ammonium nitrate or $NO_x$ gases. The ACTOSOL® fixed nitrogen is then available directly to plants as slow-release nitrogen, and can directly replace nitrogen derived from urea or other sources in plant fertilizers.

ACTOSOL® is manufactured by ARCTECH, Inc. of Chantilly, Va. ACTOSOL® is a family of products based upon humic acid extracted from Lenordite coal. The ACTOSOL® family of products includes four products:

Professional ACTOSOL® : humic acids dissolved in water at 3% w/w concentration, pH¯9.5

Professional ACTOSOL®Plus Fe: ACTOSOL®with added iron micronutrients, pH¯7;

Garden ACTOSOL® : 3% humic acid, 10% nitrogen (as N), 10% phosphorus (as $P_2O_5$) and 5% potassium (as $K_2O$), pH¯9;

Lawn ACTOSOL® : 3% humic acid, 15% nitrogen (as N), 3% phosphorus (as $P_2O_5$) and 5% potassium (as $K_2O$), pH¯9;

For the process of the present invention, Professional ACTOSOL® is used, with potassium hydroxide added.

The carbonaceous material remaining from the denitrification process is non-explosive and is taken up in the humic acid matrix. This material is available to plants and soil microbes as a carbon source.

The humic acid matrix chelates any metal ions released from the explosive or propellant as a consequence of the denitrification process, and makes these metal ions available to plants as micronutrients. Examples of beneficial micronutrients that can be obtained from explosive and propellant compositions are magnesium, lithium, boron, calcium, and others, as well as mixtures thereof. Metals to be avoided, unless other treatments are undertaken to remove them, in formulations to be demilitarized, are lead, chromium, cadmium, and similar heavy metals because of their adverse environmental impact.

The process of the present invention can also be used to treat propellants containing radioactive materials. The humic acid matrix chelates the radioactive elements released from the explosive or propellant as a consequence of the denitrification process and removes them from solution. The humic acid/radioactive material chelate can then be removed, as by filtration, and the radioactive material can be reclaimed from the chelate or can be disposed of in an appropriate manner.

The radioactive elements most commonly associated with propellants and explosives include the radioactive isotopes of uranium, plutonium, thorium, radon, and radium. Uranium and thorium are capable of enrichment to many times the typical norms, and are particularly difficult to remove from propellants and explosives. Because the most common radioactive contaminants are heavy elements, they are readily chelated by the humic acid present in the alkalinized humic acid solution.

The process of the present invention can be used to treat soil or water contaminated with propellants or explosives and which is also contaminated with radioactive isotopes which are from a source other than the propellants or explosives. For example, ore-process residues in which $^{226}Ra$ and $^{228}Ra$ are concentrated are particularly hazardous, and when soils are contaminated with such ore residues as well as propellants or explosives, a treatment with a single reagent, i.e., the alkalinized humic acid of the present invention, is useful and economical.

Humic acid chelate containing radioactive contamination removed from the propellant is removed by flocculation of the humic acid chelate mixture, followed by filtration or centrifugation. The humic acid chelates are effective in tying up the radioactive elements for safe disposal.

The present invention provides a cost effective, efficient method for rendering explosive and propellant materials safe, while using these materials for fertilizers. There is no need for open burning or detonation of the explosive materials, thus preventing air and water contamination from these processes. Metal ions which are present as trace elements in some explosive or propellant formulations can be included as chelated, slow release micronutrients for plants. Therefore, there is no requirement for separating and alternately disposing of these metal ions.

In addition, the process of the present invention can be used to treat soils contaminated with explosives or propellants, by treating the contaminated soil directly with an alkalinized ACTOSOL® solution. In a similar fashion, water that has been contaminated with explosives or propellants can be treated with alkalinized ACTOSOL® solution and the resulting solution incorporated into a fertilizer. When the soil or water is also contaminated with radioactive material, the humic acid chelates the radioactive materials for disposal or recycling.

Soil remaining after treatment to remove propellant contamination is neutralized with an acid, preferably phosphoric acid for its phosphate content. After neutralization, the soil is enriched in nutrients and humic acid chelates, making the soil suitable for plant growth. This is a particularly valuable product for use in agriculture in soil which has been rendered sterile by conventional treatment processes, such as thermal processes or incineration. The soil remaining after being treated according to the process of the present invention is suitable for use as topsoil.

The process of the present invention can also be used to treat ground water contaminated with explosives or radioactive materials. This is most economically feasible when the contaminated ground water is used as feedwater to the process. The very dilute fertilizer mixture resulting from this process could be incorporated into a liquid fertilizers, such as Professional ACTOSOL®.

Process water generated during the manufacture of certain explosives, so-called pink water or red water, can be treated by the process of the present invention. The process water is presently treated by activated carbon filters, which results in hazardous waste which is difficult to dispose of. By treating this process water with an alkaline aqueous solution of humic acid, the humic acid removes the propellant or explosive, and produces a useful liquid fertilizer. To prepare fertilizer in a dry or solid form, the humic acid chelates are removed by flocculation with a conventional flocculant (aluminum sulfate, aluminum chloride, polyaluminum sulfate-silicate, ferric chloride, calcium hydroxide, starch and starch derivatives, guar gum, synthetic polymers such as polyacrylamide-acrylic polymers and polyamines, etc.) and settling, centrifugation or filtering.

According to the present invention, ACTOSOL® humic acid in a basic medium hydrolyzes explosives and propellants containing nitrogen-containing compounds The basic medium may comprise any aqueous base sufficient to raise the pH to about 10 to 14, but potassium hydroxide is preferred for its potassium content, which is useful in fertilizers. Since ACTOSOL® already contains potassium hydroxide as part of its formulation, additional potassium hydroxide may or may not be required, depending upon the concentration of the explosive to be demilitarized.

The base reacts with nitrogen containing and/or nitrate ester groups on the nitrogen-containing propellant or explosive compounds by hydrolyzing them. The nitrate and nitrite groups thus freed are fixed (chelated) by the humic acid in the ACTOSOL®. The aggregate humic acid materials are then available for plant nutrition. In addition, the humic acid chelates any metal ions that are present in the original explosive or propellant formulations. These metal ions are included in the composition as micronutrients for plants.

The humic acid materials resulting from denitrification of propellants and explosives can be used alone as a fertilizer, or can be mixed with conventional fertilizer ingredients and/or fillers as desired. The humic acid chelates in the resulting fertilizer slowly release trace minerals to the soil. As the microorganisms in the soil break down the humic acid chelates, there is a slow release of nutrients to the soil. Additional micronutrients not found in propellants, such as iron, copper, boron and zinc, can be added to the fertilizer formulations.

DETAILED DESCRIPTION OF THE INVENTION

To dispose of or demilitarize nitrogen-compound containing propellants or explosives, the propellant or explosive is mixed with an aqueous basic solution of a humic acid such as ACTOSOL®. The hydrolysis liberates nitrogen, which is fixed in the humic acid. Any trace metal ions are chelated by the humic acid.

The process of the present invention uses a combination of Professional ACTOSOL® and base, such as alkali metal hydroxide up to about 30% by weight alkali metal hydroxide. It has been found experimentally that for each pound of alkali metal hydroxide added to the Professional ACTOSOL®, 1.1 pounds of single base (nitrocellulose based) or double based (nitrocellulose/nitroglycerine) propellant can be completely dissolved and destroyed. The upper limit of base is determined by the solubility of the base in the humic acid mixture, which, of course, varies with the base used. The pH of the solution is raised from about 10 to 14. One skilled in the art can readily determine what quantity of a particular base is required to raise the pH of a humic acid solution to between 10 and 14.

The ACTOSOL® is mixed with base up to the solubility limit of the base in the ACTOSOL®; for potassium hydroxide, this is approximately 20% by weight. Moreover, about 20% solids in a slurry is easy to keep suspended by agitation. Higher concentrations of the propellants may be difficult to keep suspended. A mixture of 20% potassium hydroxide and 3% humic acid has a pH of approximately 14. Of course, any base or mixture of bases can be used with the humic acid which provides a pH of from about 14, including but not limited to sodium hydroxide, lithium hydroxide, ammonium hydroxide and the like.

The hydrolysis reaction is exothermic, and a rise in temperature occurs as the reaction progresses. The reactions are preferably conducted at room temperature (to start). Starting temperatures much in excess of room temperature (much above 25° C.) may be unsafe, as boiling may lead to unreacted propellants' reaching their autoignition temperatures, with serious consequences. Also, for safety reasons, the mixture is constantly stirred during reaction, to prevent the formation of "hot spots" or clumps of reacting material.

The concentration of propellant or explosive to be treated in the reaction mixture can be any convenient amount that can be readily mixed with the basic ACTOSOL®. The concentration of explosive or propellant in the reaction mixture can be any amount that can be readily mixed for reaction. However, fear of "hot spots" is the reason the concentration of explosive to be denitrated is generally limited to about 20%. The 20% limit is not necessarily the physical limit for this process, but, depending upon the initial propellant or explosive used, it may be prudent to limit the concentration to avoid untoward incidents.

The process of the present invention can be used to recover nitrogen safely from many conventional nitrogen-containing propellant or explosive materials. Among the nitrogen-containing materials which can be treated according to the present invention are nitrocellulose, nitroglycerin, nitroguanidine, barium nitrate, and strontium nitrate. Among the aliphatic nitrate esters that can be treated by the process of the present invention are 1, 2,4- butanetriol trinitrate (BTN), diethyleneglycol dinitrate (DEGN), nitroglycerine, nitrostarch, pentaerythryritol tetranitrate, triethylene glyocoldinitrate, and 1,1,1-trimethylolethan trinitrate. Nitramines which can be treated according to the present invention include cyclotetramethylene tetranitramine, cyclotrimethylene trinitramine, ethylenediamine dinitrate, nitroguanidine, and 2,4,6-trinitrophenylmethylnitramine, and mixtures thereof. These lists are by no means exhaustive, and other nitrogen-containing propellants and explosives are also amenable to treatment by the method of the present invention. Typical propellant/explosive items treated by the method of the present invention include ammonium picrate, 1,3-diamino-2,4,60-trinitrobenzene, 1,1',4,4',6,6'-hexanitroazobenene, hexanitrostilbene, 1,3,5-trinitrobenzene, 2,4,6-trinitrotoluene (TNT), ammonium nitrate, and mixtures thereof.

Plastic bonded explosives comprise an explosive substantially as described above, along with a polymeric binder, plasticizer, and fuel such as aluminum or iron.

Pyrotechnics generally comprise an oxidizer, such as oxygen or fluorine, a fuel such as powdered aluminum or magnesium, and binding agents, including resins, waxes, plastics, oils, retardants, waterproofing, and color intensifiers. These pyrotechnic compositions can be denitrified by the process of the present invention.

Among the propellants that are treated by the hydrolysis of the present invention are the following:

| Propellant type | Chemical Composition, % | |
| --- | --- | --- |
| 1. Black powder | Potassium nitrate | 74.0 |
| | charcoal | 15.6 |
| | sulfur | 10.4 |
| 2. TNT | Trinitrotoluene | |
| 3. Composition B | 60/40 Cycotol | |
| | RDX | 60 |
| | TNT | 39 |
| | WAX | 1 |
| 4. Penta | Pentaerythrite tetranitrate | |
| 5. RDX (Cyclonite) | cyclotrimethylenetrinitramine | |
| 6. Tetryl | Trinitro-phenylmethyl-nitramine | |
| 7. HMX | tetranitramine | |
| 8. Amatol | Ammonium nitrate TNT | |
| 9. Ammonium nitrate | | |
| 10. Explosive D | Ammonium picrate | |
| 11. Haleite (EDNA) | Ethylene dinitramine | |
| 12. HBBX-1,3 & 6 | RDX | 39.6 |
| | TNT | 37.8 |
| | Aluminum | 17.1 |
| | Desensitizer | 5.0 |
| | $CaCl_2$ | 0.5 |
| 13. Octol | HMX | 75 |
| | TNT | 25 |
| 14. Pentolite 50/50 | PETN | 50 |
| | TNT | 50 |
| 15. Pentolite 10/90 | PETN | 10 |

| Propellant type | Chemical Composition, % | |
| --- | --- | --- |
| | TNT | 90 |
| 16. Picratol | Explosive D | 52 |
| | TNT | 48 |
| 17. Tetrytol | Tetryl | |
| | TNT | |
| 18. Torpex | RDX | 42 |
| | TNT | 40 |
| | Aluminum | 18 |
| 19. Tritonal | Aluminum | |
| | TNT | |
| 20. Nitroglycerin | | |
| 21. Nitroguanidine | | |

Soil humus consists of organic residues from the decomposition of plant matter. Humus is formed on the floors of forests from decomposed leaves and other detritus, in soils where agricultural residues are plowed under, on the bottoms of ponds and lakes from organic matter that has grown therein or falls in. Humus also occurs in peat bogs, in lignite deposits, and many other types of minerals and soils, such as Leonardite. Humus is as an important soil constituent for enhancing the growth of plants. The formation of soil humus depends upon an adequate supply of raw organic residues and upon suitable conditions for their decomposition. Should either condition be lacking, the eventual decrease in soil humus content leads to reduced soil fertility. In these cases, the addition of organic matter is necessary to increase the fertility of the soil.

Humic acid is the portion of soil humus that is soluble in alkaline solution but insoluble in acid solution. This form of humus is the form of organic matter that often is added to the soil to increase fertility. Humic acid is found in rotting vegetable matter and can be detected in the black slime of an ordinary compost pit in a home garden. It is also found in the brown organic matter of a variety of soils, as well as in peats, manure, lignite, leonardite and brown coals. Humic acid does not have a single unique structure, but is a mixture of intermediate chemical products resulting from the decomposition and conversion of lignin and other plant materials to hard coal. Humic acid is apparently formed by the bacterial and chemical degradation of plant tissue, but in soils it also can be formed by certain secondary processes such as polymerization of polyphenols leached by rain from surface leaf litter, and condensation of phenols, quinones, and proteins that are provided by the action of soil microorganisms and small animals on soil carbohydrates. As a result, humic acid cannot be characterized in rigid terms of chemical composition or chemical properties.

Alexander, in U.S. Pat. No. 5,034,045, describes a method for producing a highly concentrated aqueous solution of humares in combination with additives to increase the effect of the humates for use in agriculture and horticulture. This patent, and the patents cited therein, are hereby incorporated by reference in their entirety.

Humic acid has a large cation exchange capacity and holds monovalent and multivalent elements, such as macronutrient and micronutrient elements, very strongly. The molecular weights of the humic acid range from 800 to 500,000, with the weight average molecular weight being from about 5000 to about 50,000. The cation exchange capacity of the humic acid varies from about 200 to about 600 meq $CaCO_2$ per 100 grams at pH 7, depending upon the origin of the extracted acid. Humic acid is a polyelectrolytes and is believed to form complexes with clay particles, thus enabling humic acid to bind monovalent and multivalent elements with great tenacity. When the cation exchange sites on the humic acid molecule are filled predominantly with hydrogen ions, the material, which is considered to be an acid, is insoluble in water. However, when the predominant cations at the exchange sites are other than hydrogen, the material is called a "humate". Humates of the monovalent alkali metals or ammonia are soluble in water, but the humates of most multivalent metals are insoluble.

Humic acid in the form of their ammonium salts are soluble in water and, when mixed with soil, has been found to promote plant growth. Specifically, ammonium humate increases root growth and root formation, deepens the color of leaves, flower and fruit, increases branching at high application rates, and increases the volume of fruit obtained. The hydrolysis product of the present invention forms a variety of products, depending upon the initial propellant or explosive used as feed. In the case of single and double base propellants hydrolyzed in the presence of alkalinized humic acid, nitrate and nitrite ion are formed, as well as a hydrocarbonaceous substance which responds as humic acid to a humic acid analysis. In the case of triple base propellants (those containing nitroguanidine), ammonia is formed in addition to the nitrite ion and nitrate ion.

After denitrification is complete, the concentration of materials in the solution varies, depending upon what and how much material was denitrated. The products as assayed for NPK, and humic acid contents are then formulated to the desired final product, which may be 10-10-10 or 15-3-5, or any other mixture which can be used as fertilizer. Although the product is generally formulated to contain about 3% humic acid, this amount can vary depending upon the ultimate use to which the product is put.

Fertilizer made from the hydrolysis product of the present invention is generally used as an aqueous solution. For best results as a fertilizer, the reaction mixture is formulated with additional plant nutrients and is neutralized by addition of acid to a pH between about 5 and 10, and more preferably to between about 7 and 9.5. Any conventional acid can be used for the neutralization, including phosphoric acid, hydrochloric acid, acetic acid, and the like. Alternatively, the product can be dried and/or granulated for use as a fertilizer, using any conventional fillers as required. The fertilizer can be formulated as a slow release fertilizer by adding conventional slow release ingredients.

The hydrolysis product of the present invention can be used alone as a fertilizer for plants as a source of nitrogen and trace minerals, or can be mixed with a conventional fertilizer to provide complete plant nutrition. Nitrogen, phosphorus and potassium are the primary macronutrient elements required both as plant nutrients and to improve soil texture. Although the hydrolysis product of the present invention is rich in nitrogen as well as in humic acid, it is conceivable that a fertilizer product would be more useful with the addition of additional nitrogen. The addition of plant nutrients, such as additional nitrogen, and/or phosphorus and/or potassium to a solution of a hydrolysis product according to the present invention, makes more plant nutrients available to the plants through an effective transport mechanism attributed to the humic acid. The plant nutrients are therefore more efficiently transported into the plant along with the humic acid salt for more efficient use by the plant.

The particular plant nutrient component added to the alkali metal humate salt is not particularly limited, although the plant nutrient component should be sufficiently water-soluble such that from 0% to about 20% of nitrogen (calculated as N), and particularly from 0% to about 15% nitrogen; and/or from 0% to about 45% phosphorus (calculated as $P_2O_5$), and especially from 0% to about 30% phosphorus; and/or from about 0% to about 25% of potassium (calculated as $K_2O_5$), and particularly from 0% to about 15% potassium, can be incorporated into the hydrolysis product of the present invention. Examples of plant nutrient components that can be incorporated into the hydrolysis product, either alone or in combination, include, but are not limited to, ammonium nitrate, potassium chloride, ammonium phosphates, potassium phosphates, water-soluble polyphosphates, potassium hydroxide, potassium nitrate, potassium sulfate, sodium nitrate, potassium carbonate, ammonium sulfate, calcium nitrate, ammonium chloride, and mixtures thereof.

Where the propellant or explosive composition denitrified by the present invention has few if any micronutrients, suitable amounts of micronutrients can be added to the hydrolysis product to improve the crop yield of agricultural and horticultural crops. Any micronutrient plant nutrient can be added to the hydrolysis product, including but not limited to the water-soluble salts of iron, boron, manganese, magnesium, copper, zinc and molybdenum, such as the sulfate, nitrate, chloride, oxide, carbonate, chelate and borate salts of the micronutrient plant nutrients. Each of these micronutrient plant nutrients can be added to the hydrolysis product of the present invention in required amounts to provide optimum nutrition for the plants to be treated.

The hydrolysis product of the present invention can be formulated to comprise a complete fertilizer, or it can be used to supplement conventional fertilizers for agricultural and horticultural crops. The nitrogen component of the hydrolysis product, along with any additional nitrogen, potassium, and phosphorus added to the product, acts as the primary nutrient source for both plants and microflora, and the humic acid component aids in transporting the fertilizer and micronutrient elements from the soil to the plant. Humic acid and humate salts are able to absorb fertilizer components and regulate fertilizer release to plants, ultimately making the fertilizer more effective. As a result, judicious use of the fertilizers made according to the present invention, particularly in conjunction with additional plant nutrient components, will improve plant growth performance in marginally fertile soils or soils with low native organic matter and will improve yields of crops grown in arid regions of the world.

Fertilizers prepared according to the present invention may be used on any seeds or crops, and are not limited to a specific species. The fertilizers may be used to increase the crop yields of food crops such as soybeans, peas, potatoes, eggplant, cucumbers, melons squash, cabbage, cauliflower, small grains, sweet potatoes, peanuts, strawberries, citrus, peppers, flowers, corn, carrots, tomatoes, and the like.

The following specific examples are provided in order to describe the invention, and are not meant to limit the invention in any way. All percentages used herein are percentages by weight, unless otherwise specified.

EXAMPLE 1

One gram of dried Hercules RS nitrocellulose was placed into a beaker containing 100 ml of Professional ACTOSOL® to which 5% potassium hydroxide had been added. The mixture was allowed to react with mixing for 48 hours, at which time all of the nitrocellulose had been consumed. The mixture was analyzed for released nitrogen and was found to contain 87 mg as nitrite ion.

EXAMPLE 2

One percent dried Hercules RS nitrocellulose was mixed with a soil to simulate the soil which could be found at a nitrocellulose contaminated industrial site or process water lagoon. The soil was mixed with alkalinized Professional ACTOSOL® in a ratio of one part liquid to five parts soil. The Professional ACTOSOL® contained 20% potassium hydroxide. The mixture was allowed to react and was monitored over time. Ninety percent of the nitrocellulose was destroyed during a 72 hour reaction period. The nitrocellulose was converted into nitrate and nitrite ions and humic acid. This example demonstrates that the invention can be used to remediate site contaminated by explosives or propellants.

EXAMPLE 3

One gram of IMR 4831 Single base (nitrocellulose based) propellant was placed into a beaker containing 19 ml of Professional ACTOSOL® containing 20% potassium hydroxide. The mixture was allowed to react at a temperature of 40° C. for 138 hours. At the end of that time, all of the propellant had been destroyed, and 100% of the theoretical nitrogen contained n the propellant was found in solution as nitrate and nitrite ions.

EXAMPLE 4

The experiment of Example 3 was repeated at 20° C. At 138 hours only 64% of the theoretical nitrogen contained in the propellant was found in solution as nitrate and nitrite ions. Residual propellant was noted in the beaker.

EXAMPLE 5

One gram of CMR 830 Double base (nitrocellulose/nitroglycerin based)$_{13}$ propellant was placed into a beaker containing 19 ml of Professional ACTOSOL® containing 20% potassium hydroxide. The mixture was allowed to react at room temperature over a period of 48 hours. At the end of that time all of the propellant had been destroyed and 100% of the theoretical nitrogen contained in the propellant was found in solution as nitrate and nitrite ions.

EXAMPLE 6

One gram of Hercules 2400 Double base (nitrocellulose/nitroglycerin based) propellant was placed into a beaker containing 19 ml of Professional ACTOSOL® containing 20% potassium hydroxide. The mixture was allowed to react at room temperature over a period of 48 hours. At the end of that time all of the propellant had been destroyed and 100% of the theoretical nitrogen contained in the propellant was found in solution as nitrate and nitrite ions.

EXAMPLE 7

0.7 grams of M30 propellant (a triple base propellant) was intentionally contaminated with 50 mg of uranium oxide ($U_2O_3$) dissolved in 2M HCl. The sample was dried and then placed into a beaker containing 19 ml of Professional ACTOSOL® containing 20% potassium hydroxide. The mixture was allowed to react at room temperature for a period of 48 hours. At the end of that time all of the propellant had been destroyed. The humic acid chelated the uranium. Alum was added to the mixture, and the humic acid/uranium complex was flocculated. The mixture was centrifuged and the clarified liquid was decanted. More than 90% of the uranium which had been added to the propellant was found in the flocculated humic acid sediment. This sediment, once dried, was suitable for disposal in a low level radioactive waste disposal facility.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed is:

1. A method for denitrifying or hydrolyzing nitrogen-containing propellants or explosives containing at least one compound selected from the group consisting of nitrocellulose; nitroglycerin; nitroguanidine; barium nitrate; strontium nitrate; nitrate esters; nitramines; ammonium pictate; 1,3-diamino-2,4,6-trinitrobenzene; 1,1',4,4',6,6'-hexanitroazobenzene; hexanitrostilbene; 1,3,5-trinitrobenzene; 2,4,6-trinitrotoluene; ammonium nitrate; and mixtures thereof, comprising adding a nitrogen-containing propellant or explosive to an effective amount of an aqueous solution of humic acid at a pH of about 10 to 14 to hydrolyze or denitrify the at least one nitrogen compound in the propellants or explosives.

2. The method according to claim 1 wherein the nitrate esters are selected from the group consisting of 1, 2,4-butanetriol trinitrate (BTN), diethyleneglycol dintrate (DEGN), nitroglycerine, nitrostarch, pentaerythryritol tetranitrate, triethylene glyocoldinitrate, 1,1,1-trimethylolethan trinitrate and mixtures thereof.

3. The method according to claim 1 wherein the nitramines are selected from the group consisting of cyclotetramethylene tetranitramine, cyclotrimethylene trinitramine, ethylenediamine dinitrate, nitroguanidine, 2,4,6-trinitrophenylmethylnitramine and mixtures thereof.

4. The method according to claim 1 wherein said nitrogen-containing propellants and explosives further contain metal ions.

5. The method according to claim 4 wherein said metal ions are selected from the group consisting of magnesium, lithium, boron, calcium and mixtures thereof.

6. The method according to claim 4 wherein the metal ions are radioactive.

7. The method according to claim 1 wherein said propellants contain radioactive materials.

8. The method according to claim 7 wherein said radioactive materials are chelated by said humic acid to form humic acid chelates and said humic acid chelates are removed by flocculation.

9. The method according to claim 1 wherein said aqueous solution of humic acid contains potassium hydroxide.

10. A method for remediating soil contaminated with nitrogen-containing propellants or explosives containing at least one compound selected from the group consisting of nitrocellulose; nitroglycerin; nitroguanidine; barium nitrate; strontium nitrate; nitrate esters; nitfamines; ammonium pictate; 1,3-diamino- 2,4,6-trinitrobenzene; 1,1',4,4',6,6'-hexanitroazobenzene; hexanitrostilbene; 1,3,5-trinitrobenzene; 2,4,6-trinitrotoluene; ammonium nitrate; and mixtures thereof, comprising adding to said soil an effective amount of an aqueous solution of humic acid at a pH of about 10 to 14 to hydrolyze or denitrify the at least one nitrogen compound in the propellants or explosives.

11. The method according to claim 10 wherein said aqueous solution of humic acid contains potassium hydroxide.

12. A method for making a fertilizer composition comprising adding to at least one nitrogen-containing propellant or explosive containing at least one compound selected from the group consisting of nitrocellulose; nitroglycerin; nitroguanidine; barium nitrate; strontium nitrate; nitrate esters; nitramines; ammonium picrate; 1,3-diamino-2,4,6-trinitrobenzene; 1,1',4,4',6,6'-hexanitroazobenzene; hexanitrostilbene; 1,3,5 -trinitrobenzene; 2,4,6-trinitrotoluene; ammonium nitrate; and mixtures thereof, an effective amount of an aqueous solution of humic acid at a pH of from about 10 to about 14 and adjusting the pH to from about 5 to about 10.

13. The method according to claim 12 wherein potassium and phosphorus are added to said fertilizer composition.

14. A fertilizer composition made by a process comprising adding to at least one nitrogen-containing propellant or explosive containing at least one compound selected from the group consisting of nitrocellulose; nitroglycerin; nitroguanidine; barium nitrate; strontium nitrate; nitrate esters; nitramines; ammonium picrate; 1,3-diamino-2,4,6-trinitrobenzene; 1,1',4,4',6,6'-hexanitroazobenzene; hexanitrostilbene; 1,3,5-trinitrobenzene; 2,4,6-trinitrotoluene; ammonium nitrate; and mixtures thereof, an effective amount of an aqueous solution of humic acid at a pH of from about 10 to about 14 and adjusting the pH to from about 5 to about 10.

15. A method for denitrifying or hydrolyzing nitrogen-containing propellants or explosives containing at least one compound selected from the group consisting of nitrocellulose; nitroglycerin; nitroguanidine; barium nitrate; strontium nitrate; nitrate esters; nitramines; ammonium picrate; 1,3-diamino-2,4,6-trinitrobenzene; 1,1',4,4',6,6'-hexanitroazobenzene; hexanitrostilbene; 1,3,5-trinitrobenzene; 2,4,6-trinitrotoluene; ammonium nitrate; and mixtures thereof, said nitrogen-containing propellants or explosives being present in an aqueous system, comprising adding to said aqueous system an effective amount of an aqueous solution of humic acid at a pH of about 10 to 14 to hydrolyze or dentrify the at least one nitrogen compound in the propellants or explosives.

16. The method according to claim 15 wherein said aqueous solution of humic acid contains potassium hydroxide.

* * * * *